J. D. HARRIS.
FLEXIBLE HOSE PROTECTOR.
APPLICATION FILED JUNE 29, 1908.
1,062,155.
Patented May 20, 1913.
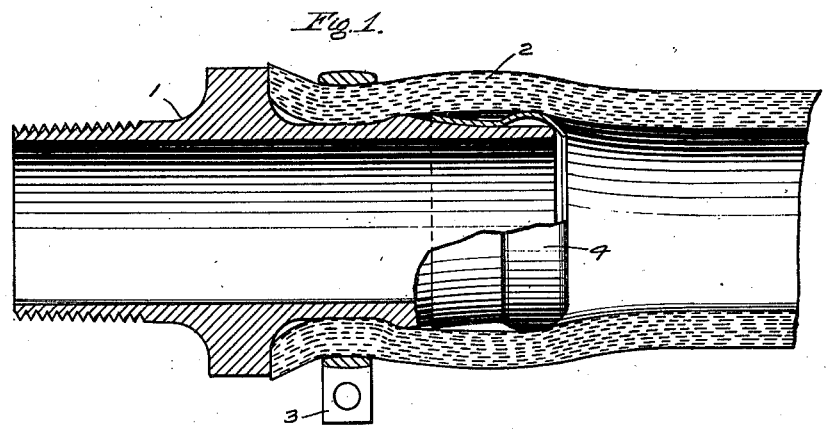
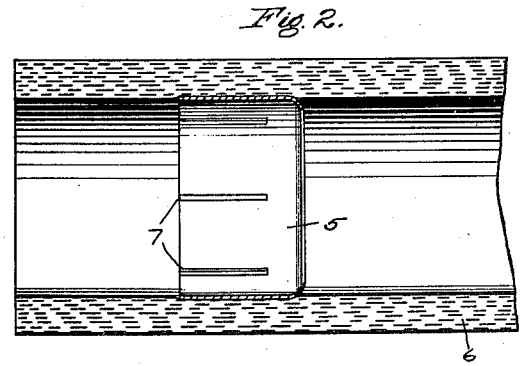
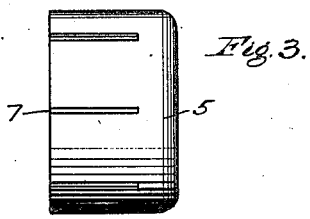
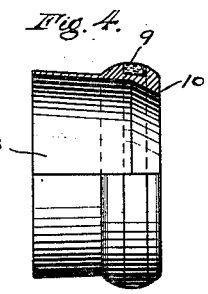
WITNESSES
INVENTOR
Joseph D. Harris
by E. Wright
Att'y.

UNITED STATES PATENT OFFICE.

JOSEPH D. HARRIS, OF PITTSBURGH, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLEXIBLE-HOSE PROTECTOR.

1,062,155.            Specification of Letters Patent.       Patented May 20, 1913.

Application filed June 29, 1908. Serial No. 440,796.

*To all whom it may concern:*

Be it known that I, JOSEPH D. HARRIS, a citizen of the United States, residing at Pittsburgh, in the county of Allegheny and State of Pennsylvania, have invented new and useful Improvements in Flexible-Hose Protectors, of which the following is a specification.

This invention relates to a hose protecting device, more particularly for the flexible hose which is employed between railway cars to connect up train pipe lines.

In fitting up flexible hose, a nipple adapted to be connected to the train pipe, is slipped into one end of the hose and clamped and a coupling half section is similarly applied to the other end. The nipple and coupling ends which are forced into the flexible hose sometimes have burs or rough projections which are liable to cut and damage the inner tube of the flexible hose both in assembling and in service when the hose is stretched by the cars pulling apart. This is of course very objectionable and it is highly desirable to avoid such damage.

The main object of my invention is to obviate this difficulty and for this purpose the invention comprises a protecting metallic cap adapted to surround the nipple end and thereby prevent contact between the inner tube of the hose and the nipple.

In the accompanying drawing; Figure 1 is a central sectional view of a nipple connected to a flexible hose section, illustrating one construction of my invention applied thereto; Fig. 2 a central section of a flexible hose end with a somewhat modified construction of my improvement applied; Fig. 3 a side view of the hose protecting cap shown in Fig. 2; and Fig. 4 a partly sectioned view of still another form of protecting cap.

Fig. 1 illustrates an ordinary flexible hose nipple 1 with a flexible hose section 2 clamped thereon by means of the clamp 3. According to my improvement a cap 4 is provided which is preferably formed from brass tubing and having one end of rounded contour with the outer edge turned inwardly sufficiently to prevent all possibility of the extreme end portion of the nipple coming in contact with the inner tube of the flexible hose. The rear portion of the cap may be made slightly taper so as to readily fit over the end portion of the nipple. With this form of my invention, the cap is first placed over the end of the nipple and the flexible hose is then slipped on and clamped in place in the usual manner. It will now be seen that as the inner tube of the hose rubs on the rounded portion of the cap 4 in assembling, the hose is protected from damage by reason of exposure to the raw edges of the nipple end, and likewise in service the hose works about the smooth rounded portion of the cap and thus cannot be damaged.

In the construction shown in Fig. 2 the protecting cap 5 is inserted within the flexible hose 6 at the proper distance from the end, preferably being placed on the mandrel in the inner tube in the process of vulcanizing, so that when the hose is completed, the cap is firmly secured in place. The cap may be provided with a number of longitudinal slits to allow for expansion when pressing the nipple in place, and the inner edge may be rounded in as desired to shield the hose from the end of the nipple.

The protecting cap 8, shown in Fig. 4, is similar in construction to that shown in Fig. 1, but has an additional feature as follows: The rounded portion 10 of the cap is provided with a circumferential groove within which is secured a band 9 of soft rubber or other flexible material. The purpose of this being to provide a cushion for the flexible hose to bear upon.

It will thus be seen that by means of my invention damage to the flexible hose is prevented, and furthermore that the construction may be readily applied to the ordinary standard hose connections.

Having now described my invention, what I claim as new and desire to secure by Letters Patent is:—

1. A device for protecting flexible hose, comprising a metallic cap adapted to fit over the end of a nipple, and a non-metallic cushion carried by the cap for engaging the flexible hose.

2. A device for protecting flexible hose ends, comprising a metal cap adapted to fit over the end of a nipple, and a rubber cushion mounted on the cap to engage the inner tube of the flexible hose.

In testimony whereof I have hereunto set my hand.

JOSEPH D. HARRIS.

Witnesses:
R. F. EMERY,
WM. M. CADY.